United States Patent
Robinson

(10) Patent No.: US 7,860,992 B2
(45) Date of Patent: Dec. 28, 2010

(54) METHOD OF AND APPARATUS FOR ADAPTIVE CONTROL OF DATA BUFFERING IN A DATA TRANSMITTER

(75) Inventor: Nigel P. Robinson, Farnborough (GB)

(73) Assignee: Qualcomm Incorporated, San Diego, CA (US)

( * ) Notice: Subject to any disclaimer, the term of this patent is extended or adjusted under 35 U.S.C. 154(b) by 944 days.

(21) Appl. No.: 10/537,837

(22) PCT Filed: Nov. 27, 2003

(86) PCT No.: PCT/GB03/05205
§ 371 (c)(1),
(2), (4) Date: Dec. 14, 2005

(87) PCT Pub. No.: WO2004/054181
PCT Pub. Date: Jun. 24, 2004

(65) Prior Publication Data
US 2006/0168313 A1 Jul. 27, 2006

(30) Foreign Application Priority Data
Dec. 6, 2002 (GB) ................................ 0228520.3

(51) Int. Cl.
*G06F 15/16* (2006.01)
*H04L 12/28* (2006.01)
(52) U.S. Cl. ...................... 709/231; 370/412
(58) Field of Classification Search ................. 709/234, 709/223, 231, 236; 370/412–416
See application file for complete search history.

(56) References Cited

U.S. PATENT DOCUMENTS

| 5,802,310 A * | 9/1998 | Rajaraman ................... 709/234 |
| 7,181,223 B1 * | 2/2007 | Pecen et al. .............. 455/452.1 |

FOREIGN PATENT DOCUMENTS

| EP | 1133201 A1 * | 9/2001 |
| WO | 0042792 | 7/2000 |
| WO | 02052800 | 7/2002 |

* cited by examiner

*Primary Examiner*—Joseph E Avellino
*Assistant Examiner*—Afshawn Towfighi
(74) *Attorney, Agent, or Firm*—Nicholas J. Pauley; Abdollah Katbab

(57) ABSTRACT

A data transmitter (10) divides incoming data for transmission into data blocks and passes them in frame transmission order to a radio link stage (16) via a serial frame buffer (14). The buffer (14) holds the data frames until the radio link stage (16) is able to transmit them. The incoming data has associated with it various parameters. The radio link stage (16) has allocated to it radio link resources. The parameters and resources, which change independently of each other from time to time, are supplied to a controller (18) which calculates high and low buffer levels therefrom. The controller (18) controls the passing of the data frames through the frame buffer (14) to maintain the number of frames in the buffer at any instant of time at a level between the calculated high and low levels.

37 Claims, 1 Drawing Sheet

METHOD OF AND APPARATUS FOR ADAPTIVE CONTROL OF DATA BUFFERING IN A DATA TRANSMITTER

BACKGROUND OF THE INVENTION

I. Field of the Invention

The present invention relates generally to a method of and apparatus for transmitting data. The invention also relates to a method of and apparatus for adaptive control of data buffering in a transmitter. The method and apparatus are well suited for use in the GPRS standard but are not limited to such an application.

II. Description of the Related Art

The general packet radio system (GPRS) is a packet data based communication system that has been developed for GSM networks with the aim of providing networks built to this standard with a way to handle higher data speeds and packet switched connections. GPRS can also be used in time division multiple access (TDMA) networks (IS-136). It is intended to provide a transitional path to third generation (3G) wireless data services It enables the introduction of packet switching and Internet Protocol (IP). The GPRS standard is now well defined and is currently being deployed in existing GSM-based mobile networks, in order to provide a way for GSM operators to meet the growing demand for wireless packet data services.

The GPRS standard defines a logical link control (LLC) layer which provides a logical link between a mobile station (MS) and a serving GPRS support node (SGSN). The logical link control (LLC) provides services necessary to maintain a ciphered data link between the MS and the SGSN. The logical link is maintained as the MS moves between cells serviced by the same SGSN. When the MS moves to a cell being serviced by a different SGSN the existing connection is released and a new logical link connection is established.

The logical link control (LLC) provides for acknowledged and unacknowledged point-to-point-delivery of LLC protocol data units (PDUs) between the mobile station (MS) and the serving GPRS support node (SGSN) and point to multipoint delivery of packets from the SGSN to the MS. The LLC layer also provides for detecting errors from corrupted PDUs by checking a frame check sequence (FCS) in the LLC frame format. The FCS contains the value of a cyclic redundancy check (CRC) calculation performed over a header and information fields in a frame. For the acknowledged mode of transfer, the LLC may request retransmission of the frames of data for which an acknowledgement has not been received.

Network layer protocols are intended to operate over services derived from a wide variety of sub-networks and data links. GPRS supports several network layer protocols providing protocol transparency for users of the service. All functions relating to the transfer of protocol data units (PDUs) are carried out transparently by GPRS network entities. A layer known as the Sub-Network Dependant Convergence Protocol (SNDCP) provides this protocol transparency and support for a variety of network layer protocols. The SNDCP is logically situated below the network layer and above the LLC layer. It performs multiplexing of data coming from different sources before the data is sent via the logical link control (LLC) layer.

Data to be transmitted is first multiplexed by the SNDCP. The data is then segmented by the LLC layer to maximum length LLC frames. These LLC frames are segmented into radio link control (RLC) data blocks or radio link control/medium access control (RLC/MAC) control blocks, which are formatted into blocks of four successive time slots on the same physical channel.

The medium access control (MAC) layer provides capability for multiple mobile stations to share a common transmission medium. It interfaces directly with the physical layer. For the uplink (e.g. mobile station MS to a serving GPRS support node SGSN), the MAC layer plays the role of arbitrator, managing the limited physical resources among competing requestors. For the downlink, the MAC layer aids in the queuing and scheduling of access attempts and prioritizes data to be sent. Signaling data is given higher priority user data, but both are multiplexed onto the transmission medium by the MAC layer.

One problem with data transfer is that it can arrive in bursts depending on the source and/or medium from which it arrives. In one interval of time, several blocks of data may arrive in quick succession, whereas in the next interval of time only one block, or even no blocks, may arrive. Plainly, such "bursty" delivery of data is undesirable because it places overheads in terms of data management on the receiving entity. Ideally, the data should arrive at a constant rate that is as high as the receiving entity can competently handle.

One way in which "bursty" data could be handled would be to determine empirically the way in which the bursts of data generally arrive and to use a buffer large enough to maintain an essentially continuous flow of data from the source to the destination. While this approach will undoubtedly work, it is less than satisfactory because the buffer will have to be sufficiently large to hold data in the situation where a large burst of data arrives followed by a period of time when no data arrives. Most of the time a buffer of that size will be less than full and will therefore be underutilized. This is, of course, a waste of resources and is therefore undesirable.

SUMMARY OF THE INVENTION

The invention aims to address the above-discussed and related problems.

According to one aspect of the invention there is provided an apparatus for transmitting data, the apparatus comprising: segmenting means for segmenting data into data frames; buffering means for buffering the data frames from the segmenting means; transmitting means, connected to the buffering means to receive data frames therefrom, for transmitting the data frames; and controlling means for controlling the segmenting means, the controlling means being arranged to receive parameter data from the segmenting means and the transmitting means pertaining to the data and to the transmission of data frames, to calculate a high watermark value and a low watermark value corresponding to maximal and minimal numbers of data frames to be buffered in the buffering means, and to control the segmenting means to maintain the number of data frames in the store between the high and low watermark values.

According to another aspect of the invention there is provided a method of transmitting data, the method comprising: segmenting data into data frames; buffering the data frames; receiving buffered data frames; transmitting the data frames; receiving parameter data pertaining to the data and to the transmission of data frames; calculating a high watermark value and a low watermark value corresponding to maximal and minimal numbers of data frames to be buffered; and maintaining the number of buffered data frames between the high and low watermark values.

According to a further aspect of the invention there is provided a data transmitter in which incoming data for transmission is divided into data blocks and passed in frame transmission order to a radio link stage via a serial frame buffer which holds the data until the radio link is able to transmit it, the incoming data having associated with it various parameters and the radio link stage having allocated to it radio link resources which parameters and resources change independently of each other from time to time and are supplied to a controller which calculates high and low buffer levels therefrom and controls the passing of the data frames through the frame buffer to maintain the number of frames in the buffer at any instant of time at a level between the calculated high and low levels.

In the practice of the invention, flow control thresholds are applied to the transmit buffering levels of the RLC layer in a GPRS entity. The flow control thresholds are set as a function of both relevant internal LLC operating parameters that influence transmit delay susceptibility, and an estimate of the throughput of the radio link. The estimate depends on the assigned coding scheme and multi-slot characteristics. By altering the flow control thresholds adaptively, the flow control mechanism permits optimal levels of RLC transmit buffering over the majority of conditions.

The above and further features of the invention are set forth with particularity in the appended claims and together with advantages thereof will become clearer from consideration of the following detailed description of an embodiment of the invention given by way of example with reference to the accompanying drawings.

DETAILED DESCRIPTION OF AN EMBODIMENT OF THE INVENTION

Figure 1:
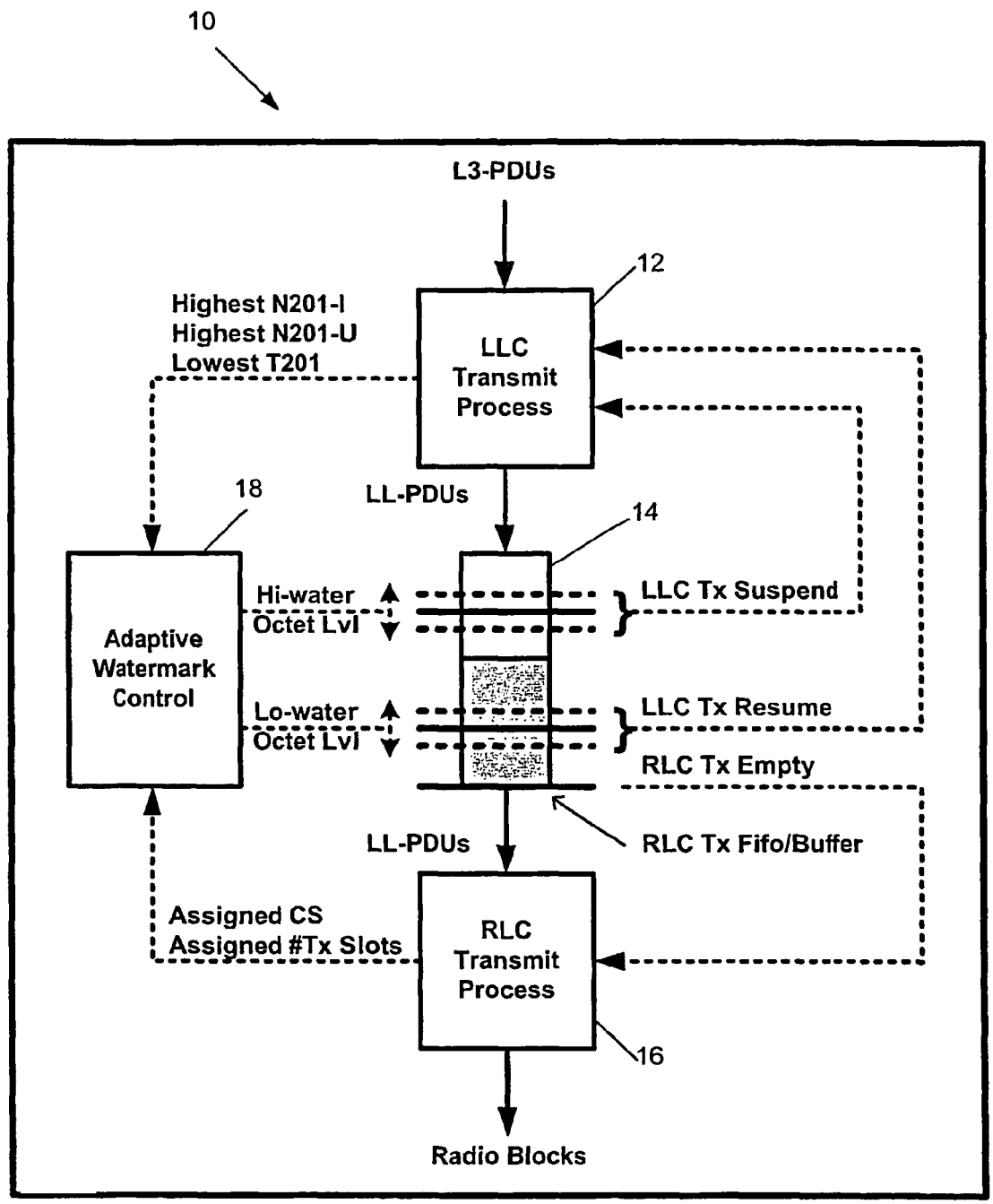
FIG. 1 shows a transmitter for transmitting data over a radio link.

Turning now to FIG. 1 of the accompanying drawings, there is shown a general packet radio system (GPRS) transmit entity 10 (e.g. a mobile station MS) in which protocol data units (PDUs) are delivered from a source (not shown) to a logical link control (LLC) layer 12 to be prepared for transmission. The SNDCP is logically situated below the network layer and above the LLC layer. Typically the data will be delivered to the LLC layer 12 from a layer known as the Sub-Network Dependant Convergence Protocol (SNDCP) which provides support for a variety of network layer protocols and performs multiplexing of data coming from different sources before the data is sent to the logical link control (LLC) layer 12.

The data from the SNDCP layer (not shown) is segmented by the LLC layer 12 into maximum length LLC frames, known as logical link protocol data units (LL-PDUs). The LL-PDUs are then input to a radio link control (RLC) FIFO buffer 14 where they are held until required by an RLC transmit process 16. Once the LL-PDUs have been supplied from the FIFO buffer 14, they are formatted into radio blocks which are output for transmission in time slots in a physical channel.

In order to adapt the typically high data rate of a data sourcing application to a typically lower data rate of a communication channel, it is desirable to propagate flow control orders back up the data protocol layers towards the data source. Flow control thresholds or "watermarks" are typically applied against a protocol layer's buffer level. The action of crossing these watermarks is to suspend or resume the processing activities of the preceding layer in the data path. While the setting of watermarks may seem to be a simple matter, the reality is that there are a number of potentially conflicting considerations that need to be taken into account.

It is desirable for the RLC transmit process 16 to be able to "see" at least two LL-PDUs for transmission at any given time. This permits the process of radio resource allocation via the media access control (MAC) protocol (not shown), to be re-negotiated for the forthcoming LL-PDU, whilst transmission of the current LL-PDU takes place. This requirement can be met by increasing the size of the FIFO buffer 14.

The LLC protocol often 'piggybacks' receive-acknowledgement signaling information on the back of data-bearing frames, together with acknowledgement request signaling. The transmit delay associated with the conveyance of a frame's potentially large data payload serves to delay the efficient operation of the protocol. This delay will be made worse by excess buffering in the path, so the need here is to reduce the size of the FIFO buffer 14.

The LLC protocol embodies a number of logical channels, each managed by its own logical link entity (LLE) (not shown). Each LLE operates to a set of internal parameters which are required to assume initial default values, but which may subsequently be re-negotiated at any time, to different values through exchange of Identity (XID) signaling transactions. One of these parameters is defined by a system timer known as "T201" (not shown) which defines how long the associated LLE shall wait for a reply following the transmission of an acknowledgement request before considering retransmission. Excessive delay in the FIFO buffer 14 could cause premature expiry and retransmission that would otherwise have been unnecessary. This will reduce the throughput of data, which is, of course, undesirable.

It will therefore be appreciated that the allocation of radio resources for a given data transfer and the effective data rate achievable in that transfer are both dynamically changing factors. Simply selecting watermarks in advance is unlikely to be acceptable because of these changing requirements.

The transmit entity 10 therefore comprises an adaptive watermark controller 18. The controller 18 is arranged to chose watermark values that provide sufficient data to satisfy the needs of the protocol layer taking receipt, i.e. the RLC layer 16 in this example, and at the same time to minimize the buffer's contribution to transmit delay as presented to the preceding protocol layers, i.e. the LLC layer 12. The controller 18 receives parameter data from the LLC layer 12 and the RLC transmit process 16 and, based on that data, determines high and low watermarks for the FIFO buffer 14.

One of the parameters of the LLC layer 12 considered to be relevant is the retransmission timer that is most susceptible to transmit delay. In the GPRS standard this is the lowest T201 retransmission time-out value from a set of LLEs that serve LLC Service Access Point Identifiers (SAPI) 3, 5, 9 and 11 and which are currently operating in the Asynchronous Balanced Mode (ABM). This is represented by the legend "LLC Lowest T201" in FIG. 1. This parameter allows a "transmit delay time" (in seconds) to be determined. This is the time required to permit a maximal length LL-PDU to convey an LLC acknowledgement request to a peer protocol entity, and for the peer protocol entity to reply with an acknowledgement, again conveyed by a maximal length LL-PDU, without premature T201 retransmission time-out.

The transmit delay time is calculated from the equation:

$$\text{transmit delay time} = \text{lowest } T201 * k$$

where k is a constant and $0 < k \leq 0.5$.

Another of the parameters of the LLC layer 12 considered to be relevant is the largest protocol data unit (PDU) size that may be transmitted. In the GPRS standard this is the highest N201-I maximal length acknowledged mode Layer 3 Protocol Data Unit (L3-PDU) size, from the set of LLEs which serve LLC SAPIs 3, 5, 9 and 11, and which are currently operating in the Asynchronous Balanced Mode (ABM). This parameter determines the size of the largest acknowledged mode LL-PDU which may be passed to the RLC layer for transmission and is represented by the legend "LLC Highest N201-I" in FIG. 1. Also of interest from the LLC layer 12 is the size of the largest unacknowledged mode LL-PDU which may be passed to the RLC layer for transmission. In the GPRS standard this is the highest N201-U maximal length unacknowledged mode L3-PDU size of all LLEs. It is represented by the legend "LLC Highest N201-U" in FIG. 1.

These parameters enable the size (in octets) of the largest LL-PDU to be determined as being the greater of either:

LLC highest N201-I+LLC maximal IS frame header size+FCS size, or

LLC highest N201-U+LLC UI frame header size+FCS size.

where: the LLC maximal IS frame header size is the maximal size of an LLC information service frame, the LLC UI frame header size is the size of an unnumbered LLC information frame, and the FCS size is the size of the frame check sequence.

Two parameters from the RLC layer 16 are also used. The first is the coding scheme (CS) designation for the current radio resource allocation, as assigned by the MAC protocol (not shown). This parameter is used to determine the size of an RLC radio block payload and is represented by the legend "Assigned CS" in FIG. 1. Typical values for the assigned CS designations CS1 to CS4 are as follows:

Coding Scheme 1, RLC radio block payload=20 octet payload;

Coding Scheme 2, RLC radio block payload=30 octet payload;

Coding Scheme 3, RLC radio block payload=36 octet payload; and

Coding Scheme 4, RLC radio block payload=50 octet payload.

The second parameter of interest from the RLC layer 16 is the number of assigned transmission slots within each eight-slot GSM frame for the current radio resource allocation, as assigned by the MAC protocol (not shown). This parameter is used to estimate the rate at which RLC radio blocks will be transmitted over the radio link and is represented by the legend "Assigned # Tx Slots" in FIG. 1.

This parameter allows the 'RLC Transmit Rate' (octets per second) to be estimated from the equation:

$$RLC \text{ transmit rate} = \frac{\text{radio block payload} * \text{assigned number of transmit slots}}{GSM \text{ Frame Interval} * 4}$$

Once these values have been calculated, the number of octets for the high watermark is determined as being the lesser of either:

(RLC Transmit Rate*Transmit Delay)−Largest LL-PDU (1 if result<0)

or (2*Largest LL-PDU)−1

The number of octets for the low watermark is then determined from the equation: low watermark=high watermark*h where h is a constant and $0 < h \leq 1$.

The watermark threshold values thus determined achieve a compromise between the desire for RLC to retain visibility of at least two LL-PDUs for efficient radio resource reallocation purposes, and the need to constrain this where LLC transmit delay restrictions exist. The foregoing calculations satisfy these requirements under the majority of applicable conditions.

Consider, for example, the following parameter values:

| | |
|---|---|
| Highest N201-I: | 1503 octets |
| Highest N201-U | 500 octets |
| Lowest T201: | 5 seconds |
| Number of Transmit Slots: | 1 |
| Coding Scheme: | 1 |
| k: | 0.4 |
| h: | 0.5 |

These parameters will give the following results:

$RLC \text{ radio block payload} =$ $\quad 20 \text{ octets(because coding scheme 1 is used)}$ $RLC \text{ data transmit rate} = (20 * 1)/(4 * 0.0046)$ $\quad = 1086 \text{ octets/second}$ $\text{transmit delay} = 5 * 0.4$ $\quad = 2 \text{ seconds}$ $\text{largest } LL-PDU = \text{greater of } 1543 \text{ or } 506$ $\quad = 1543 \text{ octets}$ $\text{high watermark} = \text{lesser of } 629 \text{ or } 3085$ $\quad = 629 \text{ octets}$ $\text{low watermark} = 629 * 0.5$ $\quad = 314 \text{ octets}$ In contrast, the following parameters:

| | |
|---|---|
| Highest N201-I: | 1503 octets |
| Highest N201-U | 500 octets |
| Lowest T201: | 5 seconds |
| Number of Transmit Slots: | 4 |
| Coding Scheme: | 1 |
| k: | 0.4 |
| h: | 0.5 | will give the following results:

$RLC \text{ radio block payload} =$ $\quad 20 \text{ octets(because coding scheme 1 is used)}$ $RLC \text{ data transmit rate} = (20 * 4)/(4 * 0.0046)$ $\quad 4347 \text{ octets/second}$ $\text{transmit delay} = 5 * 0.4$ $\quad = 2 \text{ seconds}$ $\text{largest } LL-PDU = \text{greater of } 1543 \text{ or } 506$ $\quad = 1543 \text{ octets}$ -continued $$\text{high watermark} = \text{lesser of } 7151 \text{ or } 3085$$
$$= 3085 \text{ octets}$$
$$\text{low watermark} = 3085 * 0.5$$
$$= 1542 \text{ octets}$$

The above two example illustrate how the watermarks will change as the parameters of interest change over time. The watermark controller 18 (see FIG. 1) is arranged to calculate the watermark values and to send control signals to the LLC layer 12 and the RLC layer 16. The calculated watermark values are used to define respective value bands 21 and 22. Bands are used to reduce the frequency at which operating conditions change.

When the amount of data in the FIFO buffer 16 is within the band 21 corresponding to the high watermark, a signal represented by the legend "LLC Tx Suspend" in FIG. 1 is generated and sent to the LLC layer 12. The LLC Tx Suspend signal causes the LC layer to suspend delivery of LL-PDUs to the buffer 14. When the amount of data in the FIFO buffer 16 is within the band 22 corresponding to the low watermark, a signal represented by the legend "LLC Tx Resume" in FIG. 1 is generated and sent to the LLC layer 12. The LLC Tx Resume signal causes the LC layer to restart delivery of LL-PDUs to the buffer 14. If the buffer 14 empties, a signal represented by the legend "RLC Tx Empty" is sent to the RLC layer 16. The RLC layer is then able to reallocate resources until more data is available in the buffer 14 for transmission.

Flow control thresholds are applied to the transmit buffering levels of the RLC layer in a GPRS entity. The flow control thresholds are set as a function of both relevant internal LLC operating parameters that influence transmit delay susceptibility, and an estimate of the throughput of the radio link. The estimate depends on the assigned coding scheme and multi-slot characteristics. By altering the flow control thresholds adaptively, the flow control mechanism permits optimal levels of RLC transmit buffering over the majority of conditions.

This foregoing method is primarily applicable to GPRS mobile stations, where the close physical proximity of the LLC, RLC and MAC protocol layers make the practical realization easier, but it is also applicable to other GPRS entities, and indeed, to other packet data based communication systems.

Having thus described the invention by reference to the embodiment shown in the drawing it is to be well understood that the embodiment in question is by way of example only and that modifications and variations such as will occur to those possessed of appropriate knowledge and skills may be made without departure from the spirit and scope of the invention as set forth in the appended claims and equivalents thereof.

The invention claimed is:

1. An apparatus for transmitting data, the apparatus comprising:
   segmenting means for segmenting data into data frames;
   buffering means for buffering the data frames from the segmenting means;
   transmitting means, connected to the buffering means to receive buffered data frames therefrom, for transmitting the data frames; and
   controlling means for controlling the segmenting means, the controlling means being arranged to receive parameter data from the segmenting means pertaining to the segmented data frames and radio link resources data from the transmitting means pertaining to the transmission of data frames, to calculate a high watermark value and a low watermark value in response to the received parameter data and radio link resources data corresponding to maximal and minimal numbers of data frames to be buffered in the buffering means, and to control the segmenting means to maintain the number of data frames in the buffering means between the high and low watermark values, in which apparatus the controlling means is arranged to:
   receive from the segmenting means parameter data pertaining to a time-out value of a retransmission timer susceptible to delay and pertaining to the size of a largest data frame that may be passed to the transmitting means for transmission;
   calculate a transmit delay time using the time-out value;
   calculate a size of a largest frame to be transmitted from the size of the largest data frame that may be passed to the transmitting means for transmission;
   receive from the transmitting means radio link resources data including an allocated coding scheme and a number of allocated transmission slots for the buffered data frames to be transmitted;
   calculate a transmit rate from the allocated coding scheme and the number of allocated transmission slots; and
   determine the high watermark value using the calculated transmit delay time, the calculated size of the largest frame to be transmitted and the calculated transmit rate.

2. An apparatus as claimed in claim 1, wherein the controlling means is arranged to define a high band of values including the high watermark value and a low band of values including the low watermark value.

3. An apparatus as claimed in claim 2, wherein the controlling means is arranged to generate a suspend signal for the segmenting means when the number of data frames in the buffering means is in the high band.

4. An apparatus as claimed in claim 2, wherein the controlling means is arranged to generate a resume signal for the segmenting means when the number of data frames in the buffering means is in the low band.

5. An apparatus as claimed in claim 1, wherein the controlling means is operable to control the transmitting means, the controlling means being arranged to generate a buffer empty signal for the transmitting means when the buffering means contains no data.

6. An apparatus as claimed in claim 1, wherein the controlling means is arranged to calculate a transmit delay time by multiplying the time-out value by a constant, wherein the constant has a value greater than zero and less than or equal to 0.5.

7. An apparatus as claimed in claim 1, wherein data frames may be transmitted in acknowledged and unacknowledged modes, and the controlling means is arranged to calculate the size of the largest frame as the greater of the largest data frame that may be passed to the transmitting means for transmission in the acknowledged mode and the largest data frame that may be passed to the transmitting means for transmission in the unacknowledged mode.

8. An apparatus as claimed in claim 1, wherein the controlling means is arranged to calculate the low watermark value as a fraction of the high watermark value.

9. The apparatus of claim 1, wherein the segmenting means segments the data into various length data frames in response to controls from the controlling means.

10. The apparatus of claim 1, wherein the segmenting means segments the data into a maximum length data frames allowed in response to controls from the controlling means.

11. The apparatus of claim 1, wherein the allocated coding scheme comprises a designation for a current radio resource allocation assigned by a MAC protocol.

12. The apparatus of claim 1, wherein the allocated coding scheme includes at least one of:
a 20 octet radio link control radio block payload;
a 30 octet radio link control radio block payload;
a 36 octet radio link control radio block payload; or
a 50 octet radio link control radio block payload.

13. A method of transmitting data, the method comprising:
segmenting data into data frames;
buffering the data frames;
receiving buffered data frames;
transmitting the data frames;
receiving parameter data pertaining to the segmented data frames and radio link resources data pertaining to the transmission of data frames;
calculating a high watermark value and a low watermark value in response to the received parameter data and radio link resources data corresponding to maximal and minimal numbers of data frames to be buffered; and
maintaining the number of buffered data frames between the high and low watermark values by controlling the segmenting data into data frames by monitoring the calculated high watermark value and the calculated low watermark value, the method further comprising:
receiving parameter data pertaining to a time-out value of a retransmission timer susceptible to delay and pertaining to the size of a largest data frame that may be output for transmission;
calculating a transmit delay time using the time-out value;
calculating a size of a largest frame to be transmitted from the size of the largest data frame that may be output for transmission;
receiving radio link resources data including an allocated coding scheme and a number of allocated transmission slots for transmitting the buffered data frames;
calculating a transmit rate from the allocated coding scheme and the number of allocated transmission slots; and
determining the high watermark value using the calculated transmit delay time, the calculated size of the largest frame to be transmitted and the calculated transmit rate.

14. A method as claimed in claim 13, further comprising defining a high band of values including the high watermark value and a low band of values including the low watermark value.

15. A method as claimed in claim 14, further comprising generating a suspend signal for the segmenting when the number of buffered data frames is in the high band.

16. A method as claimed in claim 14, further comprising generating a resume signal for the segmenting when the number of buffered data frames is in the low band.

17. A method as claimed in claim 13, further comprising generating a buffer empty signal for the transmitting when there are no buffered data frames.

18. A method as claimed in claim 13, further comprising calculating a transmit delay time by multiplying the time-out value of the retransmission timer susceptible to delay by a constant, wherein the constant has a value greater than zero and less than or equal to 0.5.

19. A method as claimed in claim 13, wherein data frames may be transmitted in acknowledged and unacknowledged modes, the method further comprising calculating the size of the largest frame that may be transmitted by the transmitter as the greater of the largest data frame that may be transmitted in the acknowledged mode and the largest data frame that may be transmitted in the unacknowledged mode.

20. A method as claimed in claim 13, wherein low watermark value is calculated as a fraction of the high watermark value.

21. The method of claim 13, wherein the segmenting further comprises:
segmenting the data into various length data frames in response to controls from the controlling means.

22. The method of claim 13, wherein the segmenting further comprises:
segmenting the data into a maximum length data frames allowed while maintaining the number of buffered data frames between the high and low watermark values.

23. A data transmitter in which incoming data for transmission is divided into data frames and passed in frame transmission order to a radio link stage via a serial frame buffer which holds the data until the radio link stage is able to transmit it, the incoming data having associated with it various parameters and the radio link stage having allocated to it radio link resources which parameters and resources change independently of each other from time to time and are supplied to a controller which calculates high and low buffer levels therefrom and controls the passing of the data frames through the frame buffer to maintain the number of frames in the buffer at any instant of time at a level between the calculated high and low levels, wherein the controller is arranged to:
receive parameter data contained in, and associated with, the incoming data and pertaining to a time-out value of a retransmission timer susceptible to delay and the size of a largest data frame that may be passed to the radio link stage for transmission;
calculate a transmit delay time using the time-out value;
calculate a size of a largest frame to be transmitted from the size of the largest data frame that may be passed to the radio link stage for transmission;
receive from the radio link stage radio link resources data including an allocated coding scheme and a number of allocated transmission slots for buffered data frames to be transmitted;
calculate a transmit rate from the allocated coding scheme and the number of allocated transmission slots; and
determine the high watermark value using the calculated transmit delay time, the calculated size of the largest frame to be transmitted and the calculated transmit rate.

24. An apparatus for transmitting data, comprising:
a first transmit processor operable to segment data into data frames;
a buffer operable to buffer the data frames from the first transmit processor;
a second transmit processor, connected to the buffer and operable to receive data frames therefrom, and further operable to transmit the data frames; and
a controller operable to control the first transmit processor, the controller being arranged to receive parameter data from the first transmit processor pertaining to the segmented data frames and radio link resources data from the second transmit processor pertaining to the transmission of data frames, to calculate a high watermark value and a low watermark value in response to the received parameter data and radio link resources data corresponding to maximal and minimal numbers of data frames to be buffered in the buffer, and to control the first transmit processor to maintain the number of data frames in the buffer between the high and low watermark values, the controller being further operable to:

receive from the first transmit processor parameter data pertaining to a time-out value of a retransmission timer susceptible to delay and pertaining to the size of a largest data frame that may be passed to the second transmit processor for transmission;

calculate a transmit delay time using the time-out value;

calculate a size of a largest frame to be transmitted from the size of the largest data frame that may be passed to the second transmit processor for transmission;

receive from the second transmit processor radio link resources data including an allocated coding scheme and a number of allocated transmission slots for transmitting the buffered data frames:

calculate a transmit rate from the allocated coding scheme and the number of allocated transmission slots; and determine the high watermark value using the calculated transmit delay time, the calculated size of the largest frame to be transmitted and the calculated transmit rate.

25. An apparatus as claimed in claim 24, wherein the controller is arranged to define a high band of values including the high watermark value and a low band of values including the low watermark value.

26. An apparatus as claimed in claim 25, wherein the controller is arranged to generate a suspend signal for the first transmit processor when the number of data frames in the buffer is in the high band.

27. An apparatus as claimed in claim 25, wherein the controller is arranged to generate a resume signal for the first transmit processor when the number of data frames in the buffer is in the low band.

28. An apparatus as claimed in claim 24, wherein the controller is operable to control the second transmit processor, the controller being arranged to generate a buffer empty signal for the second transmit processor when the buffer contains no data.

29. An apparatus as claimed in claim 24, wherein the controller is arranged to calculate the transmit delay time by multiplying the time-out value by a constant, wherein the constant has a value greater than zero and less than or equal to 0.5.

30. An apparatus as claimed in claim 24, wherein data frames may be transmitted in acknowledged and unacknowledged modes, and the controller is arranged to calculate the size of the largest frame as the greater of the largest data frame that may be passed to the second transmit processor for transmission in the acknowledged mode and the largest data frame that may be passed to the second transmit processor for transmission in the unacknowledged mode.

31. An apparatus as claimed in claim 24, wherein the controller is arranged to calculate the low watermark value as a fraction of the high watermark value.

32. The apparatus of claim 24, wherein the first transmit processor is further operable to segment data into various length data frames in response to controls from the controller.

33. The apparatus of claim 24, wherein the first transmit processor is further operable to segment data into a maximum length data frames allowed by the controller.

34. The apparatus of claim 24, wherein the allocated coding scheme comprises a designation for a current radio resource allocation assigned by a MAC protocol.

35. The apparatus of claim 24, wherein the allocated coding scheme includes at least one of:
a 20 octet radio link control radio block payload;
a 30 octet radio link control radio block payload;
a 36 octet radio link control radio block payload; or
a 50 octet radio link control radio block payload.

36. At least one processor configured to transmit data, comprising
a first module for segmenting data into data frames;
a second module for buffering the data frames;
a third module for receiving buffered data frames;
a fourth module for transmitting the data frames;
a fifth module for receiving parameter data pertaining to the segmented data frames and radio link resources data pertaining to the transmission of data frames;
a sixth module for calculating a high watermark value and a low watermark value in response to the received parameter data and radio link resources data corresponding to maximal and minimal numbers of data frames to be buffered;
a seventh module for maintaining the number of buffered data frames between the high and low watermark values by controlling the segmenting data into data frames by monitoring the calculated high watermark value and the calculated low watermark value;
an eighth module for receiving parameter data pertaining to a time-out value of a retransmission timer susceptible to delay and pertaining to the size of a largest data frame that may be passed to the transmitting means for transmission;
a ninth module for calculating a transmit delay time using the time-out value;
a tenth module for calculating a size of a largest frame to be transmitted from the size of the largest data frame that may be passed to the transmitting means for transmission;
an eleventh module for receiving radio link resources data including an allocated coding scheme and a number of allocated transmission slots for transmitting of the buffered data frames;
a twelfth module for calculating a transmit rate from the allocated coding scheme and the number of allocated transmission slots; and
a thirteenth module for determining the high watermark value using the calculated transmit delay time, the calculated size of the largest frame to be transmitted and the calculated transmit rate.

37. A computer program product, comprising:
a non-transitory computer-readable medium comprising:
a first set of parameters for causing a computer to segment data into data frames;
a second set of parameters for causing the computer to buffer the data frames;
a third set of parameters for causing the computer to receive buffered data frames;
a fourth set of parameters for causing the computer to transmit the data frames;
a fifth set of parameters for causing the computer to receive parameter data pertaining to the segmented data frames and radio link resources data pertaining to the transmission of data frames;
a sixth set of parameters for causing the computer to calculate a high watermark value and a low watermark value in response to the received parameter data and radio link resources data corresponding to maximal and minimal numbers of data frames to be buffered;
a seventh set of parameters for causing the computer to maintain the number of buffered data frames between the high and low watermark values by controlling the segmenting data into data frames by monitoring the calculated high watermark value and the calculated low watermark value;

an eighth set of parameters for causing the computer to receive parameter data contained within the segmented data frames and pertaining to a time-out value of a retransmission timer susceptible to delay and pertaining to the size of a largest data frame that may be passed to a transmitting means for transmission;

a ninth set of parameters for causing the computer to calculate a transmit delay time using the time-out value;

a tenth set of parameters for causing the computer to calculate a size of a largest frame to be transmitted from the size of the largest data frame that may be passed to the transmitting means for transmission;

an eleventh set of parameters for causing the computer to receive from the transmitting means radio link resources data including an allocated coding scheme and a number of allocated transmission slots for transmitting the buffered data frames;

a twelfth set of parameters for causing the computer to calculate a transmit rate from the allocated coding scheme and the number of allocated transmission slots; and a thirteenth set of parameters for causing the computer to determine the high watermark value using the calculated transmit delay time, the calculated size of the largest frame to be transmitted and the calculated transmit rate.

\* \* \* \* \*